United States Patent Office 3,352,859
Patented Nov. 14, 1967

3,352,859
PROCESS FOR IMPROVING CRYSTAL QUALITY OF A CEPHALOSPORIN ANTIBIOTIC
Harvey M. Higgins, Jr., Danville, Edwin O. Davisson, Greenwood, and Diane (DeBerry) Carver, Brownsburg, Ind., assignors to Eli Lilly and Company, Indianapolis, Ind., a corporation of Indiana
No Drawing. Filed Mar. 24, 1967, Ser. No. 625,576
8 Claims. (Cl. 260—243)

ABSTRACT OF THE DISCLOSURE

In recrystallizing cephaloridine antibiotic from an aqueous solvent by acetone dilution, a mixed aqueous solvent is used comprising methylene dichloride or chloroform or mixtures thereof to retard crystallization and methyl isobutyl ketone to improve re-solution rate and color quality.

BACKGROUND OF THE INVENTION

1. *Field of invention*

This invention relates to cephalosporin-type antibiotic substances. More particularly, this invention provides a process for improving the chemical stability, purity, physical crystalline form, and water solution properties of cephaloridine, which name is generic for 7-(2'-α-thienylacetamido)-3-pyridinomethyl-3-cephem-4-carboxylic acid, and its various cationic, anionic, and inner salt forms. Cephaloridine differs from cephalosporin C in the fact that cephaloridine has a 3-pyridinomethyl group instead of the 3-acetoxymethyl group and a 7-(2'-α-thienylacetamido) group instead of the 7-(5'-aminoadipoyl) group, and in the fact that cephaloridine possesses much greater antibiotic activity against Gram-positive and Gram-negative microorganisms than cephalosporin C.

2. *Description of the prior art*

A United States patent application of Edwin H. Flynn, Ser. No. 398,028, filed Sept. 21, 1964, and the applications parent thereto, disclose various new cephalosporin antibiotics among which is 7-(2'-α-thienylacetamido)-3-pyridinomethyl-3-cephem-4-carboxylic acid and its inner salt, as a new compound. Such compound is hereinafter referred to by the generic name, cephaloridine.

In Higgins, U.S. Patent 3,270,012, issued Aug. 30, 1966, there is disclosed and claimed an improved process for preparing 7-acylamido-3-pyridinomethyl-3-cephem-4-carboxylic acid compounds, including cephaloridine, which improvement involves reacting 7-α-acylamido-cephalorporanic acid with a pyridine in an aqueous medium containing thiocyanate or iodide ions.

A United States patent application of Billy G. Jackson, et al., Ser. No. 437,553, filed Mar. 5, 1965, discloses and claims an improved method for purifying cephalosporin $C_A$ antibiotics, including cephaloridine, involving the addition of an acid to the reaction mixture containing the 7-acylamido-3-pyridinomethyl-3-cephem-4-carboxylic acid and the thiocyanate or iodide ions to effect precipitation of the hydrothiocyanate or hydroiodide addition salt of the desired 7-acylamido-3-pyridinomethyl-3-cephem-4-carboxylic acid compound.

The cephaloridine produced by the processes described in the above prior patent and patent applications, although being an effective antibiotic, has presented some practical problems.

The cephaloridine produced in practical commercial scale operations has usually been obtained in a very fine crystal structure which crystals tend to quickly plug filtering apparatus used to separate it from solution. In addition, the color of the cephaloridine product has not been as white as is desired, nor has its re-solution rate in water been satisfactory to nurses and doctors who must redissolve the cephaloridine in water or physiological aqueous solutions for administration. Also, it has been found that cephaloridine precipitated from solutions thereof, using methanol as an anti-solvent or precipitating agent, have not been as stable upon standing as desired and that crystalline cephaloridine products formed by using methanol were cephaloridine "monohydrate" which is not as stable in terms of shelf-life as cephaloridine "hemi-hydrate" or cephaloridine anhydrate. Those in the chemical antibiotic art are therefore seeking methods for improving the chemical stability, purity and color quality, physical crystalline properties, and the water-resolution rates of this valuable antibiotically active cephalosporin substance.

An additional factor which must be considered in the crystallization of cehpaloridine, is that like other antibiotics it must be sterilized before packaging. This is usually accomplished with cephaloridine by passing a solution thereof through a sterilizing filter press or other mechanically equivalent equipment. When the cephaloridine solution is sterilized, care must be taken not to introduce unsterilized materials in the crystallization procedure. Seed crystals of cephaloridine added to the sterilized cephaloridine solution must therefore be sterilized also. How to do this and still obtain the desired crystaline form of cephaloridine has presented a substantial problem to those in the art.

SUMMARY OF THE INVENTION

Briefly, according to this invention, it has been discovered that the biological, chemical and physical properties of the cephaloridine crystalline product can be improved by mixing minor amounts of (a) methyl isobutyl ketone and (b) methylene dichloride or chloroform ($CHCl_3$), or mixtures thereof into a mixture of cephaloridine in a water/acetone mixture containing at least about 20 percent acetone by volume prior to adding cephaloridine seed slurry to effect crystallization of cephaloridine from said mixture.

The improved process of this invention works more efficiently when used after providing for the removal of undesired color and acid impurities from the cephaloridine product prior to crystallization thereof by mixing a water/acetone solution of cephaloridine inner salt adjusted in pH to from about 6 to about 7.5 with an anion exchange resin in the base (—OH⁻) form or partly in the form containing an anion of an acid having a pK'a of greater than about 4, so that the anion of the anion exchange resin can readily be displaced by the anion of the anionic cephaloridine salt which exchange permits the formation of purified cephaloridine in the inner salt form.

The methyl isobutyl ketone may be added to a water/acetone/cephaloridine solution prior to chilling the mixture to crystallization temperature or may be added simultaneously with the acetone used to effect precipitation of the cephaloridine crystals after chilling below about 20° C., preferably to between about 5° C. to about 15° C. Almost any practical minor amount of methyl isobutyl ketone will cause some improvement in the resolution rate of the cephaloridine crystals obtained. It is preferred that the amount of methyl isobutyl ketone, added as solvent for the cephaloridine seed used, or separately will be about 1 percent to about 10 percent of the total solution volume of the water/acetone/cephaloridine mixture into which it has been placed. The methyl isobutyl ketone concentration in the final solution volume (after washes and after acetone precipitant is added) is preferably from about 0.4 percent to about 2 percent of the total volume.

It has been unexpectedly found that the methyl isobutyl ketone serves not only as a dispersing solvent for the sterile seed crystals of cephaloridine but also as a wetting agent to improve the water re-solution rates of the cephaloridine crystals obtained whenever it is used. The reason therefore is not understood but the following example will illustrate this improved effect. Dried crystals of cephaloridine precipitated from water/acetone solutions thereof, using additional acetone as precipitant, usually redissolved in water in about 2 minutes. When water/acetone solutions of cephaloridine containing from about 0.8 percent to about 1 percent, by volume, of methyl isobutyl ketone were used, the cephaloridine crystals dissolved in about 45 seconds. When a cephaloridine crystallization was made from a solution of cephaloridine dissolved in 25 percent acetone in water and containing a total 5 percent by volume methyl isobutyl ketone, and three volumes of acetone to effect precipitation, the cephaloridine crystals, after drying, had a re-solution time of about 30 seconds. Another cephaloridine crystallization was made where, in addition to the 5 percent methyl isobutyl ketone in the water/acetone/cephaloridine solution, the cephaloridine seed was added in a methyl isobutyl ketone slurry. This gave an initial mixture containing a total of about 8 percent methyl isobutyl ketone before acetone antisolvent was added to precipitate the cephaloridine. Cephaloridine crystals obtained from this mixture, upon addition of acetone precipitant and after drying, had a re-solution time of about 15 seconds. As a result of these unexpected findings of this invention, it is recommended that cephaloridine be crystallized from water/acetone solutions thereof containing 0.7 percent to about 1.5 percent by volume of methyl isobutyl ketone, in addition to the methyl isobutyl ketone used for seeding.

The methylene dichloride or chloroform, or mixtures thereof, used in accordance with this invention may be added in any amount sufficient to retard the rate of cephaloridine crystallization and sufficient to favor the formation of dense, easily filtered, granular cephaloridine crystals. In addition, it has been found that the addition or commingling of methylene dichloride or chloroform, by inducing slow crystallization of cephaloridine, aids in excluding colored impurities. The methylene dichloride or chloroform may be added to a water/acetone solution of the crude cephaloridine before sterilization or before crystallization, or may be added before precipitation of the crystalline cephaloridine. It is preferred that the total volume of methylene dichloride or chloroform, or mixture thereof, be from about 0.5 percent to about 5 percent of the total solution volume of the cephaloridine/water/acetone mixture to which it is added, and from about 0.2 to about 1.0 percent of the final acetone precipitant-containing solution volume from which the cephaloridine is precipitated.

To remove either coloring material or acidic degradation products carried through from the preparation reaction mixture, the water/acetone/cephaloridine solution is preferably commingled or mixed with, or passed through, an anion exchange resin in the base (—OH⁻) form or in the salt form of an anion of an acid having a pK′a greater than 4. For convenience it is preferred that the anion exchange resin be in the form of an immiscible liquid so that it may be readily mixed or commingled with the water/acetone/cephaloridine solution. However, the anion exchange resin may be a porous solid or semi-solid if desired and the water/acetone/cephaloridine solution may be passed through the solid or semi-solid anion exchange resin in a suitable column to effect the desired anion exchange. Suitable anion exchange resins which may be used include those having tertiary amine functional groups on cross-linked acrylic polymer matrices. Typical of such anion exchange resins are those commercially available from Rohm and Haas Chemical Corporation under the trade name "Amberlite IRA–68." Other resins which may be used to purify the water/acetone/cephaloridine of contaminating materials include the strong base anionic quaternary amine base type on a polystyrene-divinylbenzene cross-linked polymer, exemplified by "IRA–900" of Rohm and Haas Chemical Company, and the nonionic nonfunctional cross-linked polymers having macropores approaching about 90 angstrom pore size, which are helpful in removing hydrophobic materials and lipid-like compounds from the cephaloridine solution. These latter type of resins are exemplified by Rohm and Haas "XAD–2" resins. The pH of the water/acetone/cephaloridine solution is carefully controlled to from about 6 to about 7.5, preferably not above 7, by suitable addition of a base which can be removed with the acetone in the mixture, preferably pyridine or a tertiary amine such as a trialkylamine, e.g., triethylamine, trimethylamine, tributylamine, just before contacting the solution with the anion exchange resin. If the pH is allowed to go too high, i.e., much above 7.5, substantial degradation of the cephaloridine takes place, with consequent loss of yield of cephaloridine activity and contamination of the product with degradation products. If the pH is too low, say, below about pH 6, these anion exchange resins do not purify the cephaloridine solution properly.

Anion exchange resins containing anions of acids having a pK′a of greater than 4 include, e.g. acetate, bicarbonate, diethylacetate, benzoate, borate, p-bromophenylacetate, p-hydroxybenzoate, and the like. For reasons of availability and economy, the acetate anion is preferred where such an anion on the anion exchange resin is desired.

The anion exchange resin in the base or weak acid anion form, as described above, is contacted with the water/acetone/cephaloridine solution in an amount and for a time sufficient to reduce the ultraviolet (240/255 millimicron) ratio to within the range of from about 1.08 to 1.10 before the crystallization procedure is begun. If the UV ratio is much higher than 1.10, the dried product obtained therefrom may not have the desired cephaloridine color.

Another test of purity of the cephaloridine product which is used to insure an almost colorless high purity product is to determine the optical density (O.D.) at a known wave length of light of a solution of the cephaloridine product in water. A convenient test used by us is to dissolve 0.5 to 1.0 g. of the dried cephaloridine product in sufficient water to provide a solution containing about 100 mg. of cephaloridine per 1 ml. of solution (10 percent solution) and to compare the percent transmission of light through a water standard under the same conditions on a Beckman Model B spectrophotometer using a light wave length of 410 millimicrons (4100 angstroms). With 0 being the relative reference point for 100 percent transmission by water and 2 being 1 percent transmission by an opaque object, the percent transmission by the cephaloridine solution should be greater than 50 percent. The resulting optical density will be less than 0.30 for a product of desired purity on this same reference scale.

We have found that for best results in terms of yield of product, and color and crystal shape, once the fine crystal cephaloridine has been dissolved in the water/acetone mixture, the process of this invention should be finished within 4 or 5 hours. We prefer to treat the cephaloridine solution with the anion exchange resin immediately after solution is substantially completed, and then to treat the purified cooled cephaloridine solutions with the acetone precipitant soon after all of the purified cephaloridine solution is recovered.

In preparing the solution of cephaloridine in the water/acetone mixtures, we prefer that the acetone content be from about 25 to about 33 percent by volume for most efficient cephaloridine concentrations, although initial acetone/water mixtures containing from about 20 percent acetone up to about 50 percent acetone may be used, if lower cephaloridine concentrations can be tolerated. For efficient operations we prefer that the cephaloridine concentration be as nearly saturated as possible, even supersaturated. We prefer that the initial cephaloridine/water/ acetone solution contain from about 300 to 425 mg./ml. of solution, although lower concentrations can be used. For reproducibility of results in plant scale manufacture we have arbitrarily selected 400 mg./ml. in a 25–33 percent acetone in water mixture as the goal of the technical person in preparing his solutions for plant manufacture of cephaloridine according to the process of this invention.

The wet cephaloridine crystalline product obtained according to the method of this invention, may be dried according to conventional methods prior to pharmaceutical composition preparation and packaging. Drying of cephaloridine crystals at about 40° C. to minimize color change is preferred. Small lots of these cephaloridine crystals can often be dried sufficiently in 18 hours or less, whereas production size lots (usually in the 50 to 100 kilogram range) often need at least 30 hours drying time at this temperature. The crystals are preferably dried until the water content thereof, as determined by the Karl Fisher method, is below about 3.00 percent by weight, preferably below about 2.75 percent.

EXAMPLE 1

This example illustrates a method for preparing cephaloridine intermediate, [7-(2'α-thienylacetamido)-3-pyridinylmethyl-3-cephem - 4 - carboxylic acid], inner salt, which is used as a starting material for this invention.

There is first prepared a solution mixture of 113 kg. of Rohm and Haas "Amberlite LA–1" liquid anionic exchange resin, 400 liters of methyl isobutyl ketone, 75 liters of deionized water, and 16 liters of glacial acetic acid. This mixture is stirred for 30 minutes, and liquid layers are allowed to separate for several hours. The lower aqueous layer is separated and discarded. The upper layer of the 25 percent LA–1 acetate anionic exchange resin in methyl isobutyl ketone is held for use in process described below.

In a suitable vessel 100 kg. of cephalothin activity (sodium cephalothin equivalent to 100 kg. of cephalothin) previously precipitated from a water-immiscible solvent such as amyl acetate, and still containing small amounts of amyl acetate after drying, is solubilized by stirring and warming to 30° C. in the presence of 100 kg. of potassium thiocyanate and 133 kg. of deionized water. When solution is effected, agitation is discontinued and the liquid layers are allowed to form and separate. The aqueous lower layer, about 333 kg., is separated and collected. The organic upper liquid layer (containing the water-immiscible solvent such as amyl acetate) is discarded. The water layer is returned to the still and 300 kg. of potassium thiocyanate, 24.5 kg. of pyridine, and 2.5 liters of 85 percent syrupy orthophosphoric acid are added. The mixture is heated to 60° C. using a controlled hot water system and the mixture is held at 58° C. to 62° C. for five hours while stirring. Then chilled deionized water is added to bring the total volume to 1350 liters. The resulting mixture is cooled to −5° C. to −10° C. and to this there is added a hydrochloric acid solution made from 59 kg. of U.S.P. hydrochloric acid in 100 liters of deionized water over 4 hours to reduce the pH to 1.0 to 1.5 while keeping the temperature at −5° C. to −10° C. The acidified mixture is stirred for 1 hour at −5° C. to −10° C. and then filtered on Buchner funnels in four loads. Each load of crude cephaloridine thiocyanate precipitate is washed with 40 liters of deionized chilled water, and partially dried by pulling air through the cake until it begins to dry at the surface.

The crude cephaloridine thiocyanate salt is purified by the following procedure: The wet cephaloridine salt is contacted first with 80 kg. of "Amberlite LA–1" anionic resin in the hyroxide form diluted in 285 liters of methyl isobutyl ketone with sufficient agitation to solubilize the cephaloridine activity at 15° C. to 20° C. Deionized water is added, if necessary, during agitation to provide a total weight of about 800 kg. The aqueous, lower phase is separated. This aqueous phase containing the cephaloridine activity is contacted twice with 275 liters of a 25 percent solution of "Amberlite LA–1" resin in the acetate form in methyl isobutyl ketone prepared as described above. The final resulting aqueous phase is contacted with 275 liters of ethyl acetate and stirred for 5 to 10 minutes at 15° C. to 20° C. The aqueous layer is separated, and subjected to vacuum distillation at room temperature to remove any remaining ethyl acetate. The aqueous cephaloridine product is then cooled to 0° C. to 2° C. A small amount of the cephaloridine seed is added and the mixture is stirred to 0° C. to 2° C. for about 15 hours to crystallize the hydrated cephaloridine as fine crystals. The cephaloridine crystals are filtered and washed with chilled water. Crude cephaloridine crystals obtained from such a procedure are referred to herein as "wet" cephaloridine. However, dried cephaloridine crystals may also be used.

The cephaloridine intermediate as prepared above may be used for practicing this invention.

The advantage of this invention involving the improved crystallization effect and color quality of cephaloridine crystals obtained are illustrated by the following examples.

EXAMPLE 2

Methanol crystallization

Eighty-three and a half grams of "wet" cephaloridine intermediate (60 percent activity and 40 percent water) obtained as described in Example 1 were dissolved in a mixture of 11.5 ml. of water and 45 ml. of acetonitrile. The solution was filtered to remove any insoluble material. The filter and residue were washed with about 5 ml. of a 50 percent acetonitrile solution. Total volume was 118 ml. The solution assayed 400 mg./ml. or 47.2 g. of cephaloridine activity. The pH of the solution was adjusted to 7 with triethylamine. Two volumes (236 ml.) of methanol were added immediately, and the solution was chilled to 10° C. When the solution became turbid, five volumes (590 ml.) of methanol were added slowly over a two-hour period while the solution was stirred. It was then filtered and washed with about 200 ml. of methanol. The cephaloridine crystals were dried for 18 hours at 40° C. and about 10 mm. pressure.

EXAMPLE 3

Acetone crystallization

Eighty-three and a half grams of the same "wet" cephaloridine intermediate (60 percent activity and 40 percent water) as was used in Example 2 were dissolved in a mixture of 41.5 ml. of water and 25 ml. of acetone. The solution was filtered to remove any insoluble material. The filter and residue were washed with about 5 ml. of a 25 percent acetone solution. Total volume was 127 ml. The solution assayed 405 mg./ml. or 51.5 g. of cephaloridine activity. The pH of the solution was adjusted to 7 with triethylamine and 2.5 ml. of methyl isobutyl ketone and 2.5 ml. of dichloromethane were added. The solution was chilled to 15° C. and seeded with 100 mg. of ground cephaloridine in 2 ml. of methyl isobutyl ketone. The solution was stirred for 1.5 hours at 15° C. to permit slow crystallization. To the resulting thick crystal slurry, 3.2 volumes of acetone were added slowly over a 2-hour period while cooling to 10° C. The solution was filtered and washed with 100 ml. of 90 percent acetone followed by about 200 ml. of 100 percent acetone. The cephaloridine crystals were dried for 18 hours at 40° C. and at about 10 mm. pressure.

EXAMPLE 4

Acetone crystallization with anion exchange resin

Eighty-three and a half grams of the same "wet" cephaloridine intermediate (60 percent activity and 40 percent water) as was used in Example 2, were dissolved in a mixture of 26.5 ml. of water and 20 ml. of acetone. The solution was filtered to remove any insoluble material.

The filter and residue were washed with about 5 ml. of a 25 percent acetone solution. The total volume was 107 ml. The solution assay 444 mg./ml. or 46.2 g. of cephaloridine activity. The solution was decolorized over 60 g. or 100 ml. of new unused "IRA-68" brand anion exchange resin that had been conditioned by pretreatment with aqueous sodium hydroxide plus a water rinse. The resin, now in the free base or hydroxide form had been slurried in water and the pH adjusted to 7 with glacial acetic acid. The resin was transferred to a 0.75" diameter column and washed with about 200 ml. of water followed with about 100 ml. of a 25 percent acetone solution. (It is possible to use regenerated resin. In this case the used resin is allowed to stand in either 1.5 N $NH_4OH$ or 1.0 N NaOH for 24 hours. It was then washed with about 100 ml. of either 0.75 N $NH_4OH$ or 0.5 N $NaHCO_3$, followed by water. The water wash was continued until the effluent pH was below 8.)

Once the cephaloridine solution was introduced onto the resin column, the first 30 ml. effluent was discarded. After passage of the cephaloridine solution proper, the column was washed with 80 ml. of a 50 percent acetone solution and a total fraction (including wash) of 139 ml. was collected. The total time for decolorizing the solution on the column was one-half hour, or about 5 ml./min. flow rate. The decolorized solution assayed 313 mg./ml. or 42.5 g. The pH was adjusted to 7 with triethylamine and 2.8 ml. of methyl isobutyl ketone (MIBK) and 2.8 ml. of dichloromethane was added to the solution. The solution was then crystallized the same as Example 3. The color (optical density [O.D] at 410 mm.) of the solution before the column was 0.361 at 100 mg./ml.; and the color of the solution after the column was 0.185 at 100 mg./ml., a 48 percent decrease in color. There was an 8 percent loss of activity across the resin column.

volumes of acetone were added slowly over a two-hour period while cooling to 6° C. The solution was filtered and washed with 100 ml. of 90 percent acetone followed by 200 ml. of 100 percent acetone. The cephaloridine crystals were dried for 18 hours at 40° C. at about 10 mm. pressure.

UV=96.5%
Wt.=20.8 g.
Yield=82%
Color 10%=0.2 (O.D. at 410 m$\mu$)
Re-soluton time=20 sec., clear sol., good wetting
K.F.=1.76%
L.O.D.=1.43%

The above crystallization as compared to a cephaloridine crystallization from water with no chloroform and methyl isobutyl ketone additives, was slower to crystallize the first hour and had larger crystals. Even slower crystallization was possible at a temperature of 16° C. to 17° C.

One percent $CHCl_3$ added to a solution of cephaloridine at 200 mg./ml. in water inhibits crystallization at 5° C. as compared to water. Example: 1% $CHCl_3$ solution=45 min.; $H_2O$ solution=15 min.

Solubility of cephaloridine is increased by the presence of $CHCl_3$ as shown by the comparison with water using water-crystallized cephaloridine. Example:

Saturation at room temperature (mg./ml.)
1% $CHCl_3$ ---------------------------------- 318
$H_2O$ ------------------------------------ 197

We claim:
1. A method which comprises adding acetone to a solution of cephaloridine in a water/acetone mixture containing at least 20 percent acetone by volume in the pres-

COMPARATIVE ANALYSIS RESULTS FOR ABOVE EXAMPLES

| Assays | Example 2, Methanol | Example 3, Acetone | Example 4, Acetone and Resin |
|---|---|---|---|
| Weight | 40.1 g | 42 g | 37 g. |
| Percent Yield | 84% | 81% | 77.3%. |
| UV Purity (240/255 m$\mu$ Ratio) | 98.5% (1.095) | 99% (1.09) | 96.3% (1.083). |
| Color at 10% (O.D. at 410 m$\mu$) | 0.684 | 0.22 | 0.188. |
| $H_2O$, K.F | 2.25% | 2.69% | 2.73%. |
| L.O.D | 2.34% | 2.6% | 2.5%. |
| Re-solution, Time | Poor wetting, clumps 30 sec. to dissolve at 26° C. | Wets well, 15 sec. to dissolve at 26° C. | Wets well, 15 sec. in solution at 26° C. Final solution was slightly turbid. |

NOTES TO TABLE

UV Purity: Ultraviolet spectral analysis including purity and ratio of the absorbance at 240 and 255 millimicrons (m$\mu$). UV purity was calculated for each cephaloridine sample by comparing the absorbance of a cephaloridine sample of known concentration in the ultraviolet scan with that of a test sample at a known concentration.

Color at 10% (O.D. at 410 m$\mu$): Color of 10% solution of cephaloridine in water measured at 410 m$\mu$.
Observed O.D.×.0253=mg./ml. of cephaloridine.

Percent Purity = $\frac{\text{mg./ml. of cephaloridine, calculated}}{\text{mg./ml. of cephaloridine, weighed}} \times 100$.

$H_2O$, K.F.: Water content by Karl Fisher method.
L.O.D.: Loss of weight on drying, 3 hours at 60° C., 10 mm.
X-ray: All samples conformed to cephaloridine X-ray reference pattern.

EXAMPLE 5

*Chloroform addition in place of methylene dichloride, in acetone crystallization of cephaloridine*

Twenty-five grams of cephaloridine were dissolved in a 25 percent acetone solution. The solution was filtered to remove any insoluble material. The filter and residue were washed with about 5 ml. of a 25 percent acetone solution. Total volume was 62 ml. The solution assayed 395 mg./ml. or 24.5 g. The pH of the solution adjusted to 7 with triethylamine after 0.67 ml. of chloroform ($CHCl_3$) and 0.67 ml. of methyl isobutyl ketone (MIBK) had been added. The solution was chilled to 15° C. and seeded with 100 mg. of ground cephaloridine in 0.67 ml. of MIBK. The solution was stirred one hour at 15° C. to permit slow crystallization. To the resulting thick crystal slurry, 3.2 ence of minor proportions of (a) methyl isobutyl ketone and (b) methylene dichloride, chloroform, or mixtures thereof to crystallize cephaloridine from such solution.

2. A method as defined in claim 1 wherein the methyl isobutyl ketone (a) is present in the final volume after acetone addition in a concentration of from about 0.4 percent to about 2.0 percent by volume, and the component (b) is methylene dichloride which is present in the final volume after acetone addition in a concentration of from about 0.2 percent to about 1.0 percent by volume, and the final acetone concentration after acetone addition is from about 50 percent to 90 percent by volume.

3. A method as described in claim 1 wherein the methyl isobutyl ketone (a) is present in the final volume after acetone addition in a concentration of from about 0.4 percent to about 2.0 percent by volume, and the component (b) is chloroform which is present in the final volume after acetone addition in a concentration of from about 0.2 percent to about 1.0 percent by volume, and the final acetone concentration after acetone addition is from about 50 percent to 90 percent by volume.

4. A method which comprises adding to cephaloridine in a water/acetone liquid solution (a) methyl isobutyl ketone in an amount sufficient to improve the re-solution rate of the cephaloridine crystals obtained therefrom, and (b) methylene dichloride or chloroform or mixtures thereof in an amount sufficient to retard the rate of cephaloridine crystallization from the resulting solution upon the addition of additional acetone, whereby to favor the formation of dense, easily filtered, crystals.

5. A method as described in claim 4, wherein the methyl isobutyl ketone (a) is used in an amount of from about 1 to about 10 percent of the volume of the cephaloridine/water/acetone solution to which it is added, and component (b) is methylene dichloride which is used in an amount from about 0.5 to about 5 percent of the cephaloridine/water/acetone solution to which it is added.

6. A method as described in claim 4, wherein the methyl isobutyl ketone (a) is used in an amount of from about 1 percent to about 10 percent of the volume of the cephaloridine/water/acetone solution to which it is added, and component (b) is chloroform which is used in an amount of from about 0.5 to about 5 percent of the cephaloridine/water/acetone solutions to which it is added.

7. In a process for preparing cephaloridine by precipitating cephaloridine crystals from cephaloridine solutions, the improvement which comprises crystallizing with additional acetone cephaloridine from water/acetone solution containing at least about 20 percent acetone by volume in the presence of (a) methyl isobutyl ketone which is present in a minor amount sufficient to improve the re-solution rate of cephaloridine crystals obtained from such solution, and (b) methylene dichloride or chloroform, or mixtures thereof which is present in a minor amount sufficient to favor the formation of granular cephaloridine crystals from said solution.

8. A process as defined in claim 7, wherein the methyl isobutyl ketone (a) is present in a concentration of from about 0.4 percent to about 2 percent of the final volume of the mixture, and component (b) is methylene dichloride which is present in a concentration of from about 0.2 percent to about 1 percent of the final volume of the mixture.

References Cited
UNITED STATES PATENTS 3,270,012   8/1966   Higgins _____ 260—243

NICHOLAS S. RIZZO, *Primary Examiner.*